2,717,748

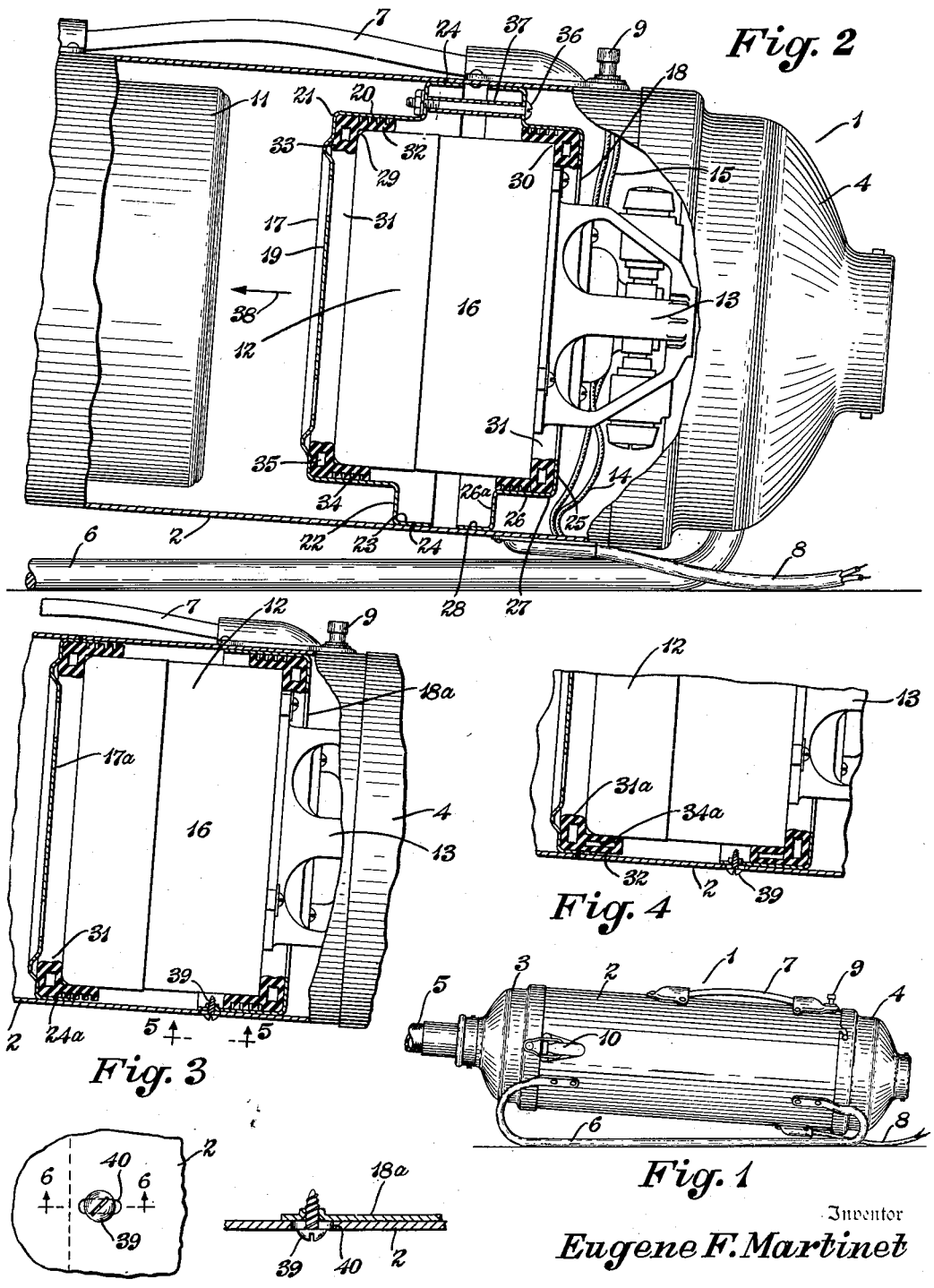
Sept. 13, 1955  E. F. MARTINET  2,717,748
SUCTION CLEANER MOTOR MOUNTING CONSTRUCTION
Filed Aug. 24, 1950
Inventor
Eugene F. Martinet
Attorneys United States Patent Office 2,717,748
Patented Sept. 13, 1955

SUCTION CLEANER MOTOR MOUNTING CONSTRUCTION

Eugene F. Martinet, Cleveland, Ohio, assignor, by mesne assignments, to Royal Appliance Mfg. Co., Cleveland, Ohio, a corporation of Ohio Application August 24, 1950, Serial No. 181,269

1 Claim. (Cl. 248—26)

The invention relates to suction cleaners, and more particularly to a mounting construction for mounting a usual or standard motor in a tank type suction cleaner with a minimum of noise and vibration in use.

A usual or standard motor for a tank type suction cleaner includes as an assembled or self-contained unit an electric motor and a centrifugal fan. Heretofore, in mounting such a motor-fan unit in a tank type suction cleaner, a solid rubber gasket or suspending mounting ring has been used to reduce the transmission of noise or vibration to metal parts of the tank.

However, the resilience of solid rubber rings is limited, such that when the solid rubber is clamped tight enough normally to hold the motor-fan unit in proper position, there is insufficient remaining resilence to give satisfactory noise and vibration isolation when the motor is running. Thus, when the motor is running, a thrust reaction develops directed toward the suction end of the motor incident to the fan suction. This thrust reaction further clamps or compresses such solid rubber mounting ring and thereby reduces the noise and vibration isolation characteristics thereof.

Attempts to utilize sponge rubber to solve this problem have not resulted in a satisfactory construction because no known sponge rubber is available which will not take a permanent set. Thus, sponge rubber will not provide the required remaining resilience to take care of the motor thrust when running and at the same time provide the required clamped mounting of the motor.

Accordingly, it is an object of the present invention to provide a new motor mounting construction for a tank type suction cleaner which clamps and holds the motor in proper position when at rest, and which continues to maintain noise and vibration isolation from the cleaner tank when the cleaner is operating, while yielding to the motor thrust reaction when running.

It is a further object of the present invention to provide a new mounting construction for a tank type suction cleaner motor and fan unit which isolates vibration incident to motor and fan operation much more efficiently than in prior constructions, resulting in a considerable reduction in the amount of noise made by the cleaner while running.

Also, it is an object of the present invention to provide a new mounting construction for the motor and fan unit of a tank type suction cleaner which isolates motor noise from surrounding sheet metal parts, where the noise, if not isolated, may be built up and amplified.

Another problem which has arisen in prior constructions utilizing solid rubber mounting rings, concerns the loosening of the clamped joint resulting from the repeated thrust reactions of the motor when running. This loosening of the joint may permit the motor unit to turn within the cleaner as a result of the high initial torque exerted by the motor when it is started. If, because of a loose mounting, the motor should turn in the cleaner tank, electrical wiring to the motor may be cut through or torn out, resulting in cleaner breakdown.

It is, therefore, a further object of the present invention to provide a new motor mounting construction for a tank type suction cleaner which maintains noise and vibration isolation at all times, and at the same time holds the motor tightly clamped against turning in its mounting at all times.

Moreover, in prior constructions, the attempts to provide a satisfactory motor mounting construction have always required extremely close tolerances as to the dimensions of sheet metal stampings, the assembly thereof, and the size of the rubber mounting rings, thereby increasing manufacturing costs.

Accordingly, it is a further object of the present invention to render it unnecessary to maintain close tolerances in the size of sheet metal stampings utilized in a tank type cleaner construction, in the assembly of such stampings, and in the size of the improved motor mounting elements.

Finally, it is an object of the present invention to satisfy the need and solve existing problems in the mounting of motor-fan units in tank type suction cleaners, to eliminate prior art difficulties in this field, generally to improve and simplify tank type suction cleaner construction, and to obtain the foregoing advantages and desiderata in a simple, inexpensive, and effective manner.

These and other objects and advantages apparent to those skilled in the art from the following description and claim may be obtained, the stated results achieved, and the described difficulties overcome, by the improvements, elements, combinations, sub-combinations, arrangements, and constructions which comprise the present invention, the nature of which is set forth in the foregoing general statement, preferred embodiments of which—illustrative of the best mode in which applicant has contemplated applying the principles—are set forth in the following description and shown in the drawing, and which are particularly and distinctly pointed out and set forth in the appended claim forming part hereof.

The nature of the discoveries and improvements in motor mounting construction for a tank type suction cleaner may be stated in general terms as preferably including in a suction cleaner, cleaner tank walls, a motor-fan unit for the cleaner, flanged or shouldered motor clamping and mounting rings surrounding axially-spaced, annular shoulder members on the motor-fan unit, hollow L-shaped rubber mounting rings surrounding the motor-fan unit and interposed between the clamping ring and motor-fan unit shoulders, means for mounting the clamping rings within the cleaner tank walls, and means for applying a predetermined tension upon the hollow rubber mounting rings through said clamping rings.

By way of example, the improved suction cleaner motor mounting construction of the present invention is shown in the accompanying drawing forming part hereof wherein:

Figure 1 is a side elevation of a tank type suction cleaner equipped with the new motor mounting construction;

Fig. 2 is an enlarged fragmentary view of a portion of the cleaner illustrated in Fig. 1, with certain parts thereof broken away and in section illustrating one form of improved motor mounting construction;

Fig. 3 is a fragmentary view similar to a portion of Fig. 2, showing an alternate form of construction;

Fig. 4 is a fragmentary view similar to a portion of Fig. 3, illustrating a still further modified form of construction;

Fig. 5 is an enlarged fragmentary view looking in the direction of the arrows 5—5, Fig. 3; and Fig. 6 is a fragmentary sectional view taken on the line 6—6, Fig. 5.

Similar numerals refer to similar parts throughout the various figures of the drawing.

A tank type cleaner is indicated generally at 1, and includes a tank member 2, suction and blower end caps 3 and 4 respectively, a suction hose 5, runners 6, a handle 7, a cord 8 leading to a source of power, an operating switch 9, and releasable cap clamps 10.

Within the suction end of the tank 2 (Fig. 2) there is located filter bag means indicated generally at 11, and a motor-fan suction unit generally indicated at 12 is mounted within the other end of the tank adjacent the operating switch 9. The motor of the unit 12 is generally indicated at 13 and may be connected by wires 14 with the cord 8 and also by wires 15 with the operating switch 9; and the fan of the unit 12 is enclosed within the annular housing 16.

The motor-fan unit 12 is located, positioned, clamped, and held, in accordance with the present invention, by shouldered motor clamping and mounting ring or cup members, generally indicated at 17 and 18. The member 17 is preferably a cup-shaped member and includes the perforated wall 19 through which the suction established by the fan in the unit 12 acts to establish a condition of suction around the filter bag means 11 within the tank member 2. The member 17 also includes an annular flange wall 20, forming with the perforated wall 19 an annular shoulder 21, and the wall 20 terminates in an outturned flange 22 which terminates in a cylindrical flange 23. The member 17 is mounted within the tank member 2 by spot-welding the flange 23 to the tank member, as indicated at 24.

The mounting ring member 18 includes an inturned flange 25, a cylindrical flange 26 forming with the flange 25 the shoulder 27 similar to the shoulder 21, and the flange 26 terminates in an outturned flange 26a and a cylindrical flange 28 also received within the tank member 2.

The housing 16 is formed with annular shoulders 29 and 30 at either end thereof complementary to the mounting ring shoulders 21 and 27, respectively; and hollow L-shaped annular rubber mounting rings generally indicated at 31 are interposed between the shoulders 29 and 21, and 30 and 27, respectively.

In accordance with the present invention, each rubber mounting ring 31 is ring-shaped and comprises an axially-extending flange portion 32 and a radially-extending flange portion 33. The outer surface of the flange portion 32 is provided with spaced annular grooves 34, while the flange portion 33 has substantial thickness and is provided with a hollow chamber 35 closed from the exterior and extending completely annularly around the member 31. As illustrated in Fig. 2, the chamber 35 in each rubber mounting ring 31 is located axially beyond the shoulders 29 and 30 of the housing member 16 of the motor-fan unit 12.

The rubber mounting rings 31 prior to assembly have air under atmospheric pressure trapped within the chambers 35.

In assembling the motor-fan unit 12 to the cleaner 1, the left-hand rubber mounting ring 31 (Fig. 2) is located within the mounting member 17, the motor-fan unit is then telescoped within the flange 32 of the ring 31, and the mounting member 18 with another rubber mounting ring 31 therein is telescoped over the other end of the motor-fan unit and connected to the mounting member 17 by a plurality of circumferentially spaced bolts 36, with tubular spacer members 37 surrounding the bolts and engaged with flanges 22 and 26a of members 17 and 18, respectively.

The length of the spacer members 37 is determined such that when the bolts 36 are drawn up tightly, a predetermined amount of pressure on the rubber mounting rings 31 is exerted between the shoulders 29 and 30 of the motor-fan unit 12, and 21 and 27, respectively, of the mounting members 17 and 18. This pressure compresses the flanges 33 of the rubber mounting rings 31, thereby reducing the size of the chambers 35 therein. This reduced size of chambers 35 results in compressing the air therein a desired predetermined amount.

When the motor is running and suction is produced by the fan of the unit 12, a thrust reaction of the unit 12 occurs directed toward the suction end of the cleaner and indicated by the arrow 38 in Fig. 2. As a result of such thrust the unit 12 moves somewhat in the direction of the arrow 38, thus increasing the pressure in the left-hand rubber mounting ring cavity 35 which thereby increases the resistance of the rubber mounting ring to such thrust. At the same time, the pressure within the cavity 35 of the right-hand mounting ring 31 is still sufficient to hold the right-hand end of the housing 16 tightly clamped in proper position, thereby compensating for the thrust movement of the unit 12.

The rubber mounting rings 31 adequately isolate the noise and vibration of the unit 12 incident to motor operation, from the metal mounting members 17 and 18 and the tank wall 2, so that such noise and vibration are not transmitted thereto or amplified thereby. This noise and vibration isolation characteristic of the improved construction of the present invention continues effective even during the thrust reaction of the unit 12 just described, because the rubber clamping members 31 continue to cushion the unit 12 and hold it tightly clamped in proper position.

Desirably, the grooved axial flanges 32 of the rubber mounting rings 31 have substantial length for locating the motor in proper position radially of the tank member 2, and the grooves 34 therein cut down the area of contact of solid rubber between the casing 16 and mounting members 17 and 18 by which the unit 12 is mounted. The less is the area of solid rubber contact, the less is the possibility of transmitting vibration.

At the same time, the improved construction holds the motor-fan unit 12 tightly clamped at all times against turning or rotating relative to the tank member 2, because the clamp mounting does not loosen up even when a thrust reaction of the unit 12 occurs in the direction of the arrow 38. Such turning has occurred in prior constructions due to a loosening of the mounting joint because of repeated starting of the motor and the initial turning torque resulting when the motor is started.

In other words, the improved construction not only provides sufficient resilience in the mounting to eliminate or absorb or isolate the noise and vibration at all times, but at the same time it holds the motor-fan unit 12 tightly clamped within the tank member to avoid relative rotation of the unit 12 with respect to the tank member which, if occurring, may damage or cut the electrical wires 14 and 15 connected to the unit 12 and extending to or through the tank member 2.

Because of the particular construction and arrangement of the parts utilized to mount the motor-fan unit 12 in the cleaner which have been described, it is unnecessary to maintain close tolerances in manufacture and assembly of the parts, excepting in the length of the tubular spacer members 37, because the rubber mounting rings 31 and the predetermined pressure or tension applied thereto are sufficient to compensate for slight inequalities in dimensions of the parts.

It will be observed that the motor, when mounted in the horizontal tank type cleaner illustrated, will exert some downward pressure on the mounting construction due to its weight, but this pressure is relatively small as compared with the thrust exerted in the direction of the arrow 38 when the motor is running. In other words, the mounting construction is adequate to maintain noise and vibration isolation irrespective of the relatively small downward thrust of the motor due to its weight. Where the construction of the present invention is used in mounting a motor-fan unit vertically in a vertical tank type cleaner, all of the thrust is in a downward direction, including the thrust due to motor operation and the thrust due to the weight of the motor; and the improved construction therefore can be used with equal advantage in a vertical tank type cleaner.

The motor-fan unit 12, in accordance with the present invention, rides in its mounting, in effect, on an air cushion, and air has a very desirable compression ratio for compensating for the reactions occurring incident to cleaner operation.

Referring to Figs. 3, 5, and 6, a modified construction is illustrated wherein the mounting members 17a and 18a have a simple cup-shape. The mounting ring 17a is spot-welded at 24a to the tank member 2, and the member 18a is clamped by screws 39 to the tank member 2 in proper position to establish the desired predetermined pressure on the rubber mounting rings 31. For this purpose, the screws 39 may extend through slots 40 in the walls of the tank member 2, by which means the mounting member 18a may be located in the proper position to obtain the desired predetermined pressure when the parts are assembled through the use of a jig or gauge in assembly. Alternately, the slots 40 may be screw holes spaced the proper distance from the member 17a to obtain the desired predetermined pressure.

A further modified construction is illustrated in Fig. 4, wherein the construction of the rubber mounting rings 31a is modified to provide for a second annular air pressure chamber 34a in the axial flange wall 32 to take the place of the grooves 34 illustrated in Fig. 2. In this manner, the area of solid rubber contact between the ring 31a, unit 12, and tank member 2, is reduced.

Another new result obtained by the improved motor mounting construction of the present invention is that the substantial resiliency of the mounting and of the rubber rings 31 helps to prevent leakage between the front or suction end of the motor-fan unit 12, and the mounting ring cup member 17 for the front end of the unit 12. It may sometimes happen that the wall 19 of the member 17 adjacent the shoulder 21, which constitutes the seat on the ring 17 against which the rubber mounting ring 31 is pushed by the motor-fan unit 12, may be slightly distorted or wrinkled in a radial direction. By the improved construction, the rubber mounting ring 31, even when clamped in motor mounting position, has sufficient resilience to take up for such irregularities or distortion or wrinkling in the cup member 17 to maintain a suction seal without necessitating compressing the ring 31 to a point where the pressures would be so great, if the ring were a solid rubber ring, that the vibration isolation characteristics of the mounting would be destroyed.

Accordingly, the present invention provides a new and improved motor mounting construction for mounting any usual or standard type of motor-fan unit in a tank type suction cleaner with a minimum of noise and vibration in use; provides a construction in which isolation of noise and vibration continues when the motor is running; provides a construction in which the mounting joint cannot become loosened to permit relative turning of the motor unit and tank and consequent damage to electrical connections; provides a construction which does not require close tolerances in the manufacture of the parts to be maintained; and provides a construction which eliminates prior art difficulties and overcomes long standing problems in the tank type cleaner field.

In the foregoing description, certain terms have been used for brevity, clearness, and understanding; but no unnecessary limitations are to be implied therefrom beyond the requirements of the prior art, because such terms are used for descriptive purposes herein and not for the purpose of limitation and are intended to be broadly construed.

Moreover, the description of the improvements is by way of example and the scope of the present invention is not limited to the exact details illustrated, nor to the specific devices shown.

Having now described the features, discoveries, and principles of the invention, the construction and operation of preferred embodiments thereof, and the advantageous, new, and useful results obtained thereby; the new and useful elements, combinations, sub-combinations, arrangements, and constructions, and mechanical equivalents obvious to those skilled in the art, are set forth in the appended claim.

I claim:

In a suction cleaner motor-fan unit mounting ring including a resilient annular member having spaced radial walls and spaced axial inner and outer walls arranged in rectangular relation forming a closed annular chamber, the member also having an axal flange portion extending from the outer wall, the outer surfaces of the flange portion and of the outer wall being aligned, the flange portion being provided with a series of annular rectangular grooves in its outer surface, and the groove nearest the rectangularly arranged walls being substantially in alignment with the adjacent radial wall.

References Cited in the file of this patent

UNITED STATES PATENTS

| | | |
|---|---|---|
| 699,709 | Pulbrook | May 13, 1902 |
| 2,089,601 | Faber | Aug. 10, 1937 |
| 2,103,154 | Faber | Dec. 21, 1937 |
| 2,116,099 | Chamberlain | May 3, 1938 |
| 2,123,578 | Renaux et al. | July 12, 1938 |
| 2,153,414 | Dodge | Apr. 3, 1939 |
| 2,212,142 | Austin et al. | Aug. 20, 1940 |
| 2,245,334 | Fredlund | June 10, 1941 |
| 2,283,557 | Kasper | May 19, 1942 |

FOREIGN PATENTS

| | | |
|---|---|---|
| 6,208 | Australia | of 1927 |
| 660,896 | Germany | of 1938 |